United States Patent [19]

Welch

[11] 3,932,849

[45] Jan. 13, 1976

[54] SELF-CONTAINED, CONDITION RESPONSIVE CIRCUIT

[75] Inventor: Stanley B. Welch, Louisville, Ky.

[73] Assignee: General Electric Company, Louisville, Ky.

[22] Filed: June 24, 1974

[21] Appl. No.: 482,267

[52] U.S. Cl. ............................ 340/228 R; 340/285
[51] Int. Cl.² .................................... G08B 17/06
[58] Field of Search ............ 340/228 R, 285, 384 E

[56] References Cited
UNITED STATES PATENTS

| | | | |
|---|---|---|---|
| 3,191,048 | 6/1965 | Cowen | 340/285 |
| 3,226,705 | 12/1965 | Kaufman et al. | 340/384 E |
| 3,680,068 | 7/1972 | Hanchett | 340/228 R |
| 3,778,798 | 12/1973 | Heit | 340/228 R |
| 3,815,113 | 6/1974 | Welch | 340/228 R |

Primary Examiner—Glen R. Swann, III

[57] ABSTRACT

A self-contained, temperature responsive alarm control circuit uses a battery as an energy source. A solid state, free-running multivibrator provides a square wave of audio frequency which provides the pulse to turn on an emitter follower also at an audio frequency so as to energize a Wheatstone bridge across the battery at the same audio frequency. One of the legs of the Wheatstone bridge includes a temperature sensitive thermistor. A programmable unijunction transistor serves as a threshold detector for the bridge circuit which, upon its being gated into condition upon the reaching of a predetermined, preset temperature sensed by the thermistor, provides a signal to turn on an audio amplifier at the same audio frequency thereby to energize a speaker now essentially coupled across the battery to produce an audible sound.

9 Claims, 2 Drawing Figures

SELF-CONTAINED, CONDITION RESPONSIVE CIRCUIT

BACKGROUND OF THE INVENTION

1. Field of the Invention

The present invention relates to a self-contained, condition responsive circuit and more particularly to a battery portable, temperature-responsive alarm control circuit useful for providing a signal when a predetermined temperature to be sensed has been reached.

2. Description of the Prior Art

This invention was conceived as a complement to the food temperature monitoring apparatus disclosed in application Ser. No. 124,325 — Stanley B. Welch, filed Mar. 15, 1971, now U.S. Pat. No. 3,815,113, and U.S. Pat. No. 3,778,798—Heit, both assigned to the same assignee as the present invention. These food temperature monitoring devices were developed for use in monitoring the temperature of food being cooked in a baking or roasting oven. These devices provide a needle-like probe enclosing a small sensing thermistor, the probe being adapted to be driven into food, in circuit with a programmable unijunction transistor employed as a detector of a Wheatstone bridge having a low voltage AC supply and a signal alarm buzzer to be actuated upon the reaching of a desired temperature within the food.

The need arises however for some type of a food temperature monitoring device, preferably self-contained, which can be used as an add-on to an already existing cooking oven and for another application, that of use with an outdoor cooking grill. The present invention provides such a self-contained temperature monitoring device wherein a battery supplies the needed electrical energy which in turn is converted into a square wave voltage of audio frequency for operating the temperature monitoring apparatus.

SUMMARY OF THE INVENTION

In accordance with the present invention, a self-contained, condition responsive circuit of the type having impedance means for supplying an indication of a predetermined external condition to be sensed includes a pair of input supply terminals adapted to be coupled to an electrical energy source for supplying direct current. Means are provided coupled across the input supply terminals for generating a repetitive pulsed signal at an audio frequency rate and a four-leg impedance bridge network is provided having first and second common terminals arranged to be coupled across the input supply terminals and two comparison terminals intermediate respectively the first and second legs of the bridge network and the third and fourth legs. Means are provided associated with the circuit for coupling the bridge network across the input supply terminals at an audio frequency rate in response to the audio frequency pulsed signal. A threshold device is coupled to the comparison terminals of the bridge network to function as a threshold detector therefor and the condition sensing impedance means is coupled in circuit with one of the legs of the bridge network. Also included are means for giving an indication when a predetermined external condition is sensed and means for coupling the indication means across the input supply terminals in response to a switched-on state of the threshold device.

DESCRIPTION OF THE PREFERRED EMBODIMENT

Figure 1:
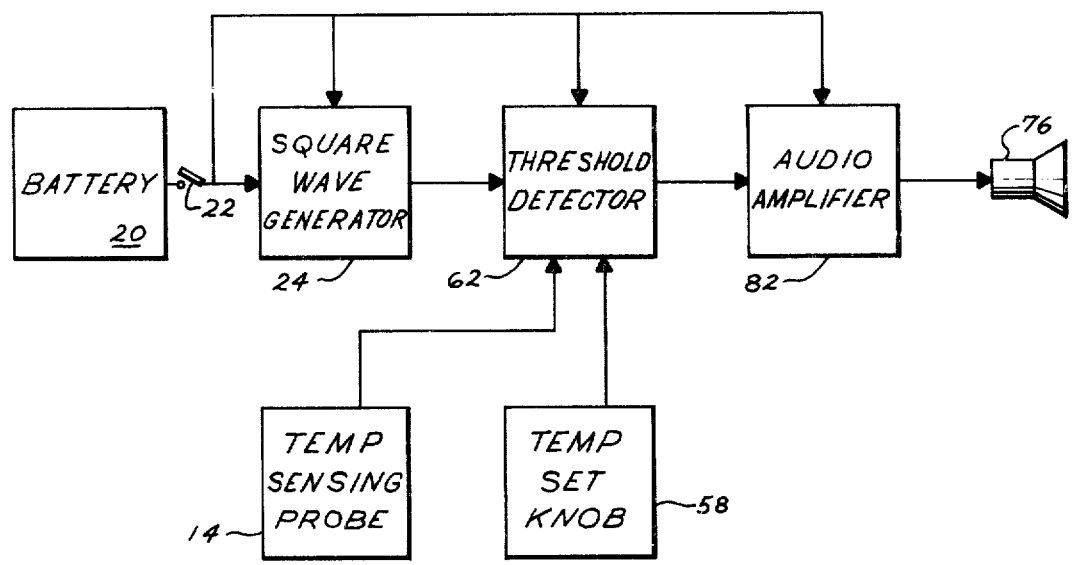
FIG. 1 is a block diagram of the preferred embodiment of the condition responsive circuit of the present invention.
Figure 2:
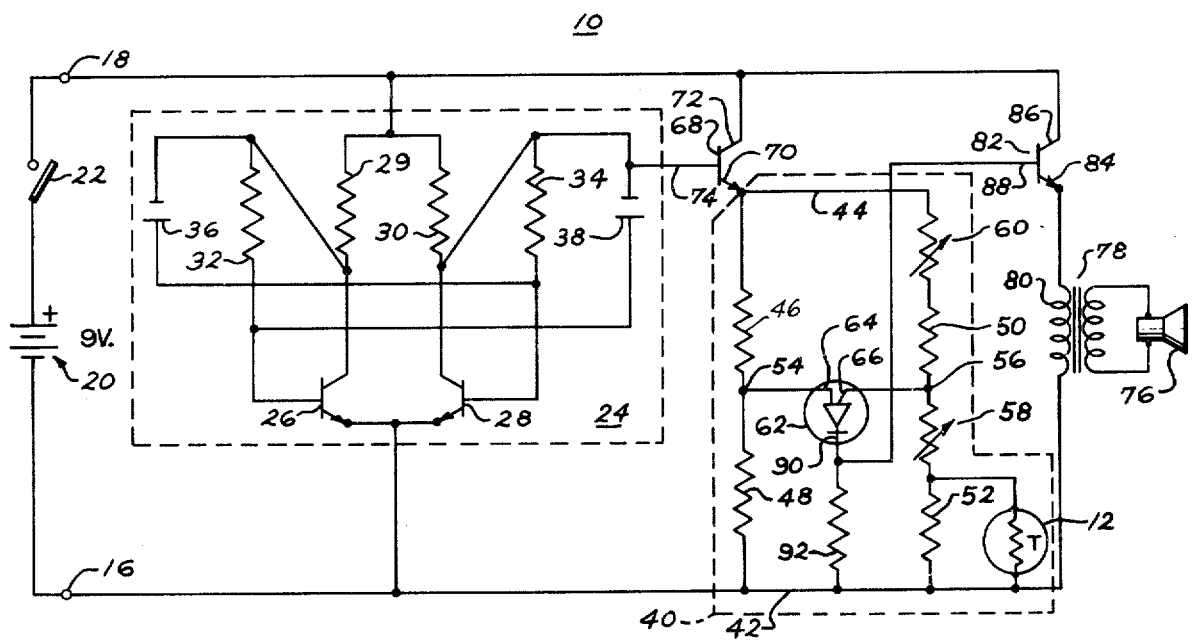
FIG. 2 is a schematic representation of the preferred embodiment of the temperature-responsive alarm control circuit of the present invention.

In accordance with the present invention and referring generally to FIGS. 1 and 2, there is shown self-contained, condition responsive circuitry such as a temperature-responsive alarm control circuit 10 in the form of a battery portable, food temperature monitoring device. The device is of the type having impedance means in the form of a thermistor 12 located in a probe 14, the probe to be inserted into food being cooked for supplying an indication when a predetermined temperature therein has been reached. Probe 14 may be of the type disclosed in application Ser. No. 124,325—Welch, now U.S. Pat. No. 3,815,113 hereinbefore mentioned. Circuit 10 includes a pair of input supply terminals 16 and 18 adapted for coupling to a DC power source such as battery 20. A manually operable switch 22 is included for ease of uncoupling the battery from the circuit when not in use.

Means are provided for generating a repetitive pulsed signal at an audio frequency rate in the form of a rectangular wave of audio frequency such as free running multivibrator 24 coupled across input supply terminal 16 and 18. Multivibrator 24 is of the type well known in the art and has been chosen to provide a square wave of a suitable audio frequency such as 500 Hz. Multivibrator 24 is a two stage amplifier and includes a pair of transistors 26 and 28, a series of resistors 29, 30, 32 and 34 and a pair of cross-coupling capacitors 36 and 38.

Also included is a four-leg impedance bridge network such as Wheatstone bridge 40 having first and second common terminals 42 and 44 respectively, the first common terminal 42 being coupled to the input supply terminal 16 and the second common terminal 44 arranged to be coupled to input supply terminal 18. Wheatstone bridge 40 comprises a first leg including a fixed resistor 46, a second leg including a fixed resistor 48, a third leg including fixed resistor 50 and a fourth leg including fixed resistor 52. The first and second legs and the third and fourth legs form, respectively, voltage divider networks having first and second comparison terminals 54 and 56. Temperature sensing thermistor 12 of probe 14 is electrically coupled in circuit, preferably removably, with the fourth leg so as to be in parallel with fixed resistor 52. A variable resistor 58 is electrically connected in circuit with the fourth leg so as to be in series with the parallel combination of thermistor 12 and fixed resistor 52. A variable resistor 60, a calibration device, is serially connected with fixed resistor 50 in the third leg.

A threshold device, such as programmable unijunction transistor (PUT) 62 functions as a threshold detector for the bridge and has its anode 64 connected to first comparison terminal 54 and a gate 66 connected to second comparison terminal 56.

A PUT is a PNPN device with characteristics such that, when the diode (anode to gate) becomes forward biased, (i.e., when the anode is slightly more positive than the gate) it conducts, and the regeneration inherent in such a device causes it to switch on; a negative resistance characteristic is generated from anode to cathode. Thus, the PUT 62 functions as a detector for the bridge network as described above.

A follower amplifier such as an emitter follower in the form of an NPN transistor 68 has its emitter coupled to the second common terminal 44 of bridge 40 and its collector 72 coupled with input supply terminal 18. Base 74 of transistor 68 is coupled to multivibrator 24 such that transistor 68 is responsive to the square wave signal generated by the multivibrator to become turned on so as to effect coupling of second common terminal 44 and thereby the Wheatstone bridge 40 to the input supply terminal 18, this serving to energize the bridge at the audio frequency rate of 500 Hz.

Means for giving an indication that a predetermined temperature has been sensed by thermistor 12 is in the form of an electromagnetic speaker 76 which includes an impedance matching transformer 78 having a coil 80, one side of which is coupled to input supply terminal 16, the other side being arranged to be coupled to input supply terminal 18 when a predetermined temperature has been sensed to effect energization of the speaker 76 to give an audible signal at 500 Hz. An audio amplifier in the form of an NPN transistor 82 has an emitter 84 coupled to coil 80, a collector 86 coupled to input supply terminal 18, and a base 88 coupled to cathode 90 of PUT 62. The junction of the transistor base 88 and cathode 90 of the PUT is coupled serially with a fixed resistor 92 to input supply terminal 16, resistor 92 serving as a means for establishing a switching level for the turning on of transistor 82.

Thermistor 12, as used here in the fourth leg of the bridge, has a negative temperature coefficient. As the temperature of the thermistor rises, its resistance drops; the voltage therefore at terminal 56, the PUT gate voltage, becomes less positive. When the anode voltage becomes slightly more positive than the PUT gate voltage, the PUT will be gated into conduction with a voltage drop from anode to cathode of approximately 1 volt. This switching signal from the PUT will cause NPN transistor 82 to be turned on to allow current to flow through thereby activating speaker 76 to produce an audible signal. Coil 80 then is essentially across the power supply input terminals 16 and 18 and current therethrough is limited only by the coil impedance and the capabilities of the energy source, here battery 20.

Turning now to the operation of the circuit 10 as a battery portable, food temperature monitoring device, a control knob (not shown) associated with the variable resistor 58, a temperature setting device, is provided for presetting the predetermined temperature at which the speaker 76 will be activated thereby giving an indication that the predetermined temperature has been reached. The value of variable resistor 58 is set such that the anode-cathode voltage of the PUT 62 exceeds its gate-cathode voltage by just enough to fire the PUT, when the temperature sensitive variable resistor, thermistor 12, reaches a value which corresponds with temperature set by the control knob associated with variable resistor 58.

A thermistor shunt resistor 52 is included to linearize the thermistor characteristics so as to yield a reasonably linear temperature scale when using a linear variable resistor 58.

The critical point of the circuit is reached when the instantaneous applied voltage across the bridge 40 is a maximum; at this point, the equivalent impedance of resistors 50, 58, 52 and 12 is some constant value and the circuit is calibrated to be critical at this value by means of the variable resistor 60 in the third leg of the bridge network.

The temperature set knob associated with the variable resistor 58 may be provided with an appropriate scale (not shown) calibrated to read a range of temperatures such that the setting of the control knob provides the variable resistor 58 with a resistance value such that the firing of the PUT 62 will coincide with the reaching of that preset temperature within the food into which the temperature sensing probe 14 has been placed, which temperature is being sensed by the thermistor 12 in the tip of that probe. Therefore upon inserting the probe 14 into the food being cooked, and after having adjusted the temperature set knob and thereby variable resistor 58, to place the circuit into operation switch 22 is manually closed by the operator. This serves then to supply DC voltage to the multivibrator 24 which in turn supplies a 500 Hz. square wave pulse to the base 74 of transistor 68. Transistor 68 then is turned on at the square wave rate of 500 Hz. to supply DC voltage from battery 20 to the bridge 40 at a 500 Hz. rate. When the temperature sensed by thermistor 12 reaches or corresponds to that temperature preset by the adjustment of variable resistor 58, PUT 62 will be gated into conduction to give a signal at the 500 Hz. rate to the base 88 of the transistor 82. Transistor 82 then will be turned on at that same 500 Hz. rate to couple coil 80 of the speaker 76 essentially across the DC supply at the rate of 500 Hz. The net result then is the production by speaker 76 of a 500 Hz. audible signal indicating that the predetermined temperature sensed by thermistor 12 has been reached.

This electric thermometer alarm system is a "slide back" system which sounds the alarm when the internal food temperatures reaches that preset temperature but does not indicate the existing temperature directly. Should the operator desire to know the internal food temperature during the cooking cycle, he may determine this by moving the control knob down the temperature scale until the alarm sounds, then reading the indicated temperature on that scale.

The circuit components of the present invention are easily adapted to be mounted upon a printed circuit board (not shown). Sufficient space may also be provided for mounting a temperature indicating scale thereon, and a simplified interconnection with a suitable cable for coupling temperature sensing probe 14 and thereby transistor 12 with the printed circuit board may also be provided.

Components found to be satisfactory in the illustrated embodiment of the present invention are:

| Thermistor 12 | National Lead type 2H103, 10 K ohms at 77° F |
|---|---|
| Battery 20 | 9 v DC |
| NPN transistors 26, 28, 68, 82 | 2N2926 |
| Resistors 29 | 3.3 K ohms |
| Resistor 30 | 10 K ohms |
| Resistors 32, 34 | 100 K ohms |
| Capacitors 36, 38 | .02 μF |
| Resistor 46 | 4.7 K ohms |
| Resistor 48 | 6.8 K ohms |
| Resistor 50 | 1.5 K ohms |
| Resistor 52 | 3.3 K ohms |

-continued

| | |
|---|---|
| Thermistor 12 | National Lead type 2H103, 10 K ohms at 77° F |
| Variable resistor 58 | 0–2.5 K ohms |
| Variable resistor 60 | 0–1 K ohms |
| PUT 62 | 2N6027 |
| Coil 80 | 8 ohms |

It should be noted, that while a battery has been shown as the DC energy source, any suitable means for supplying a DC voltage may be used. Also, although a programmable unijunction transistor is used as the threshold detector, other suitable devices may be used in lieu thereof.

While that which has been heretofore described refers to a battery powered, solid state circuit device for monitoring the temperature of food being cooked and for giving an indication when a predetermined temperature has been reached therein, it will be obvious that such a device has further novel applications. It may for example be used by fishermen to ascertain water temperature and may be used as a fire detection system. Thermistor 12 may be replaced by a photosensitive resistor thereby allowing the device to be used to activate lighting systems, and when used in conjunction with a small light source, it may be used as a smoke detection system or a burglar detector.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

What is claimed is:

1. A self-contained, condition responsive circuit of the type having condition sensing impedance means for supplying an indication of a predetermined external condition to be sensed, the circuit comprising:
   a pair of input supply terminals adapted to be coupled to an electrical energy source for supplying direct current;
   means coupled across the input supply terminals for generating a repetitive pulsed signal at an audio frequency rate;
   a four-leg impedance bridge network having first and second common terminals arranged to be coupled across the input supply terminals and two comparison terminals intermediate respectively the first and second legs of the bridge network and the third and fourth legs;
   means associated with the circuit for coupling the bridge network across the input supply terminals at an audio frequency rate in response to the audio frequency pulsed signal;
   a threshold device coupled to the comparison terminals of the bridge network to function as a threshold detector therefor;
   the condition sensing impedance means being coupled in circuit with one of the legs of the bridge network;
   means associated with the circuit for giving an indication when a predetermined external condition is sensed; and
   means associated with the circuit for coupling the indication means across the input supply terminals in response to a switched-on state of the threshold device.

2. The circuit of claim 1 wherein the condition sensing impedance means is a temperature sensing thermistor removably coupled in circuit with the fourth leg of the bridge network.

3. The circuit of claim 2 further including a manually variable resistor connected serially in circuit with the thermistor in the fourth leg to serve as a temperature setting device.

4. The invention of claim 3 wherein the circuit is a temperature-responsive alarm control circuit of the type having a probe, including the thermistor, to be inserted into food being cooked for supplying an indication when a predetermined temperature therein is reached.

5. The circuit of claim 1 wherein the means for generating an audio-frequency pulsed signal is a free-running multivibrator and the pulsed signal is a rectangular wave.

6. The circuit of claim 1 wherein the means for coupling the bridge network across the input supply terminals is a follower amplifier coupled between the second common bridge terminal and one of the input supply terminals, and is further coupled to the pulsed signal generating means.

7. The circuit of claim 6 wherein the follower amplifier is an emitter follower.

8. The circuit of claim 1 wherein the threshold device is a programmable unijunction transistor having a cathode coupled to the first common bridge network terminal, an anode coupled to the comparison terminal intermediate the first and second legs, and a gate coupled to the comparison terminal intermediate the third and fourth legs.

9. The circuit of claim 8 wherein the indication means is an electromagnetic speaker having a coil and the means for coupling the indication means across the input supply terminals is a load switching device coupled serially with the coil across the input supply terminals, the load switching device being responsive to a signal from the threshold detector to become gated into conduction.

* * * * *